US007630950B2

(12) United States Patent
Wang et al.

(10) Patent No.: US 7,630,950 B2
(45) Date of Patent: Dec. 8, 2009

(54) SYSTEM AND METHOD FOR LEARNING MODELS FROM SCARCE AND SKEWED TRAINING DATA

(75) Inventors: Haixun Wang, Irvington, NY (US); Jian Yin, Bronx, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 11/506,226

(22) Filed: Aug. 18, 2006

(65) Prior Publication Data
US 2008/0071721 A1 Mar. 20, 2008

(51) Int. Cl.
G06F 17/00 (2006.01)
G06N 5/02 (2006.01)
(52) U.S. Cl. ....................................................... 706/48
(58) Field of Classification Search ................... 706/48
See application file for complete search history.

(56) References Cited
U.S. PATENT DOCUMENTS

| | | | | |
|---|---|---|---|---|
| 5,727,124 A | * | 3/1998 | Lee et al. ................... | 704/233 |
| 5,950,158 A | * | 9/1999 | Wang ......................... | 704/244 |
| 5,963,902 A | * | 10/1999 | Wang ......................... | 704/243 |
| 6,735,566 B1 | * | 5/2004 | Brand ......................... | 704/256 |
| 7,398,268 B2 | * | 7/2008 | Kim et al. ....................... | 707/3 |
| 7,548,847 B2 | * | 6/2009 | Acero et al. ................... | 704/9 |
| 7,558,809 B2 | * | 7/2009 | Radhakrishnan et al. . | 707/104.1 |
| 7,565,369 B2 | * | 7/2009 | Fan et al. ..................... | 707/102 |

OTHER PUBLICATIONS

RUSBoost: Improving classification performance when training data is skewed Seiffert, C.; Khoshgoftaar, T.M.; Van Hulse, J.; Napolitano, A.; Pattern Recognition, 2008. ICPR 2008. 19th International Conference on Dec. 8-11, 2008 pp. 1-4 Digital Object Identifier 10.1109/ICPR.2008.4761297.*
Hulten et al., "Mining Time-changing Data Streams; in SIGKDD" ACM Press, pp. 97-106, San Francisco, CA 2001.
Wang et al.,"Mining concept-driven data streams using ensemble classifiers", in SIGKDD, 2003; 10 pages.

* cited by examiner

Primary Examiner—Michael B Holmes
(74) Attorney, Agent, or Firm—Keusey, Tutunjian & Bitetto P.C.; Kenneth Corsello

(57) ABSTRACT

A system and method for learning models from scarce and/or skewed training data includes partitioning a data stream into a sequence of time windows. A most likely current class distribution to classify portions of the data stream is determined based on observing training data in a current time window and based on concept drift probability patterns using historical information.

20 Claims, 7 Drawing Sheets

400

Input: $x$: a test case
$k$: the total number of classifiers
$\lambda$: user defined exponential decay rate
Output: $p$: a probabilistic prediction of $x$ >for each classifier $C_i \in \{C_n, C_{n-1}, ..., C_{n-k+1}\}$ do
>  invoke $C_i(x)$ to get the region $S_i$ that contains $x$;
>let $S$ be the smallest region, i.e., $S = \bigcap S_i$;
>for each region $S_i$ do
>   let $n_{i0}$ be the positive cases in region $S \subseteq S_i$;
>   let $n_{i1}$ be the negative cases in region $S \subseteq S_i$;
>   $p_i = n_{i0} / (n_{i0} + n_{i1})$;
>   $w_i = n_{i0} / (n_{i0} + n_{i1})(e^{-\lambda(n-1)t} - e^{-\lambda(n-i+1)t})$;
>$p = \sum w_i p_i / \sum w_i$;
>return $p$;

FIG. 7

SYSTEM AND METHOD FOR LEARNING MODELS FROM SCARCE AND SKEWED TRAINING DATA

GOVERNMENT RIGHTS

This invention was made with Government support under Contract No.: H98230-05-3-0001 awarded by the U.S. Department of Defense. The Government has certain rights in this invention.

BACKGROUND

1. Technical Field

The present invention relates to data stream processing and more particularly to a system and method for classifying data streams with scarce and/or skewed training data.

2. Description of the Related Art

The recent growth of e-commerce, sensor networks, and ubiquitous computing has led to the massive amount of data available in stream format. Mining data streams for actionable insights in real-time has become an important and challenging task for a wide range of applications. Compared to traditional data mining, mining data streams poses new challenges as data are streaming through instead of being statically available. As the underlying data generating mechanism is evolving over time, so are the data patterns that data mining systems intend to capture. This is known as concept drifting in the stream mining literature.

To cope with concept drifts, stream mining systems update their models continuously to track the changes. Moreover, to make time-critical decisions for streaming data of huge volume and high speed, the stream mining systems need to be efficient enough in updating the models.

There are some naive approaches for handling streams with concept drifts. One is to incrementally maintain a classifier that tracks patterns in the recent training data, which is usually the data in the most recent sliding window. Another is to use the most recent data to evaluate classifiers learned from historical data and create an ensemble of "good" classifiers. Both of these two approaches are subject to the same problem, namely, model overfitting, which has been known to affect the accuracy of a classifier.

Overfitting refers to the problem that models are too specific, or too sensitive to the particulars of the training dataset used to build the model. The following known issues can lead to model overfitting and have become more prevalent in the data streaming environment. These may include: 1) Insufficient training data. In a streaming environment, it is essential to avoid having conflicting concepts in a training dataset. For this purpose, stream classifiers, such as the two approaches discussed above, enforce a constraint by learning models from data in a small window, as small windows are less likely to have conflicting concepts. However, a small window usually contains only a small number of training instances. Thus, the constraint makes the well-known cause of overfitting more prevalent. 2) Biased training data. Stream data has the nature of being bursty. A large number of instances may arrive within a very short time, which seems to give us sufficient training data free of conflicting concepts. However, in many real-time applications, stream data that arrive within a short time interval tend to be concentrated in parts of the feature space.

For example, a large amount of packets arrive in a bursty manner may all have the same source IP (Internet Protocol) address. Models learned from or validated by such data will not generalize well for other data.

In mining static datasets, the problem of overfitting usually can be addressed by two approaches. First, enlarge the training dataset to reduce the risk of overfitting caused by insufficient training data. Second, use an evaluation data set to detect overfitting caused by biased training data—if a classifier's prediction accuracy relies on particular characteristics in the training data (e.g. the source IP address of the incoming packets), then the classifier's performance will be poor on an evaluation dataset as long as the evaluation dataset does not share these idiosyncrasies.

Unfortunately, in the streaming environment, these methods are not applicable. When there are concept drifts, the enlarged part of the training dataset or the evaluation dataset may come from a different class distribution, which undermines the purpose of reducing overfitting.

SUMMARY

A general framework is disclosed that exploits concept drifting patterns to solve the model overfitting problem. It is generally impossible to capture concept drifts using a deterministic model because concept drifts happen unexpectedly. Using a stochastic model, the current class distribution p can be related with observations of the recent training data $D_n$, $D_{n-1}$,–. The problem of finding the most-likely current class distribution p is essentially the problem of finding the class distribution p that maximizes the probability of observing $D_n, D_{n-1}$,–. Using standard optimization theory, a solution is derived for the most likely current class distribution.

Then, this solution may be approximated using a method that combines the results of a set of classifiers trained over windows of historical training data. This method is very efficient and as concepts evolve over time, adjustments to the weights assigned to each of the historical classifiers can be performed.

A system and method for learning models from scarce and/or skewed training data includes partitioning a data stream into a sequence of time windows. A most likely current class distribution to classify portions of the data stream is determined based on observing training data in a current time window and based on concept drift probability patterns using historical information.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 7 is a program for classifying a record in accordance with one illustrative embodiment;

DETAILED DESCRIPTION OF PREFERRED EMBODIMENTS

Figure 1:
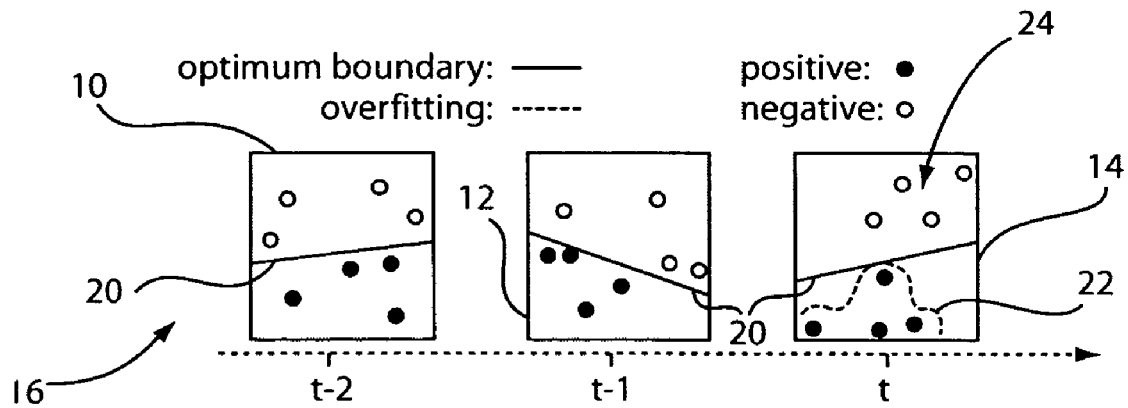
FIG. 1 is a diagram showing an effect of overfitting as a result of data scarcity.

Mining data streams of changing class distributions is one important aspect for real-time business decision support. A stream classifier should evolve to reflect the current class distribution. This poses a serious challenge: relying on historical data may increase the chances of learning obsolete models and learning only from the latest data may lead to biased classifiers, as the latest data is often an unrepresentative sample of the current class distribution.

The problem is particularly acute in classifying rare events, when, for example, instances of the rare class do not even show up in the most recent training data. In accordance with present principles, a stochastic model is employed to describe concept shifting patterns and formulate the problem as an optimization problem. The optimization problem may be stated as: from the historical and the current training data that have been observed, find the most-likely current distribution, and learn a classifier based on the most-likely distribution.

An analytic solution is derived, and this solution is approximated with an efficient method, which calibrates the influence of historical data carefully to create an accurate classifier. The method is evaluated with both synthetic and real-world datasets. The results show that method produces accurate and efficient classification.

The method may be implemented in a system as a software or hardware module capable of performing the method steps. The system may include network connections and perform processing on stream of data.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Overfitting Problem: In this section, the prevalent causes of model overfitting are analyzed in a data streaming environment. State-of-the-art stream classifiers focus on avoiding conflicting concepts in the training data, however, as will be shown, these approaches may give rise to model overfitting, a more fundamental problem that plagues the prediction accuracy in classifying streaming data.

In classifying streaming data, it may be assumed that conceptually there are two streams, one of labeled records, the other of unlabeled records. The task is to learn models from the labeled stream to classify records in the unlabeled stream. The rationale is that the two streams are generated by the same mechanism in a synchronized manner. In reality, there is often a lag between records in the labeled and the unlabeled stream, although the lag is often bounded.

For example, in on-line credit card fraud detection, a certain number of transactions are randomly selected for manual investigation. After investigation, these transactions are labeled with fraud/non-fraud flags. However, because the investigation takes a certain amount of time, the labeled stream lags behind the unlabeled stream. This restricts the process to learn from training data that are somewhat "outdated". However, in most cases, the lag is often negligible with regard to the rate of concept drifts.

To handle concept drifts in data streams, state-of-the-art stream classifiers try to select data from current class distribution to train models. In other words, the classifiers all rely on some mechanism to forget the old data. However, such a mechanism usually gives rise to model overfitting. The causes of model overfitting may be revealed by analyzing the state-of-the-art stream classifiers, which generally fall into two categories in terms of how they forget the old data.

The first category, known as the single-classifier approach learns a classifier from the data in the most recent window. The second category, known as the ensemble approach, maintains multiple classifiers trained from selected historical data.

Insufficient Training Data: One approach learns models from data in a most recent window. The assumption is that the class distribution in the most recent training dataset is close to the distribution of the data in the near future. The CVFDT algorithm described in Hulten et al., "Mining Time-changing Data Streams; in SIGKDD, ACM Press, pages 97-106, San Francisco, Calif. 2001, which maintains a decision tree classifier that models the data in a continuous time window, is a representative algorithm in this category.

In this approach, historical records are discarded when they are old or a decrease of prediction accuracy is detected. This naive approach has two problems. First, it is often difficult to find an appropriate rate to expire the old data. A lower rate would mean the window may include records from different class distributions or conflicting concepts, which makes the learned model less sensitive to the current trend and prevents it from discovering transient patterns.

A higher rate would mean the models are learned from insufficient training data, which gives rise to the problem of overfitting. Second, in a streaming environment, differences in data distributions are not necessarily good indicators of concept drifts. For example, in a case that a posterior positive class distribution is 0.5, the possibility of observing a training set of size 2 that is all negative is 0.25, the possibility of observing a training set of size 4 that includes 3 positive cases is also 0.25. When the two training sets come in adjacent time windows, it may be concluded that there is a big distribution change (from 0% positive to 75% positive), and throw away one of the training sets, although the two observations are equally likely given the posterior positive class distribution is 0.5.

Referring now in detail to the figures in which like numerals represent the same or similar elements and initially to FIG. 1, the problem of insufficient training data is demonstrated by the example shown. In this example, three blocks 10, 12 and 14 of data are shown that arrive continuously from a stream 16. Due to concept drifts, the class distribution underlying the three blocks of data may not be the same, as indicated by an optimum decision boundary 20. To reduce the influence of old data that may represent a different concept, nothing but the most recent data should be used in the stream as the training set, that is, using the training dataset 24 of window t (data in window t−1, t−2, . . . , are discarded).

However, as shown by a dotted decision boundary 22, the learned model at time t may carry a significant variance since insufficient amount of data are very likely to be overfitted. Usually, overfitting can be reduced by increasing the training set size. But this is not true for streaming data. Using a larger window to include more historical data in training may reduce classification accuracy. If the data in window t and t−1 are used together for training, the discrepancy between their underlying concepts will reduce the accuracy of the learned classifier. Using a training set having data in windows t, t−1, and t−2 will not solve the problem either. Thus, there may not exist an optimum window size to avoid problems arising from overfitting and conflicting concepts.

Biased Training Data: Instead of only employing the classifier learned from the most recent training data, another approach is to devise a mechanism to choose classifiers learned from historical training data. The ensemble-based stream classifier is a representative approach in this category (see e.g., Wang et al. in "Mining concept-driven data streams using ensemble classifiers", in SIGKDD, 2003).

The assumption is that if historical data can be gathered based on their class distribution, overfitting caused by the problem of having insufficient training data can be reduced. For example, in FIG. 1, it is easy to see that data in window t and t−2 have similar class distributions. If the classifiers learned from these two datasets are combined, the overfitting problem mentioned above can be reduced. Note that these two datasets are not continuous in time, which means their combination cannot be realized by adjusting the window size as in the first approach. In fact, the ensemble-based approach tries to enlarge the training dataset with only data of similar class distribution.

It is difficult to decide which historical dataset's class distribution is similar to that of the current dataset, as directly quantifying the class distribution change is costly. The ensemble approach solves this problem by using the most recent training dataset to score historical classifiers. A historical classifier is applied on the most recent training data and its accuracy is obtained. The accuracy is regarded as a score and used as a weight of the classifier. Classifiers of high scores form an ensemble for classifying future data.

Unfortunately, this approach introduces a new type of overfitting. For high-speed data streams, data often arrive in a bursty manner. It is very likely that data arriving within a short time period may concentrate on parts of the feature space (for example, a continuous stream of packets coming from the same source IP). In other words, the feature space is not uniformly represented in the training data.

Figure 2:
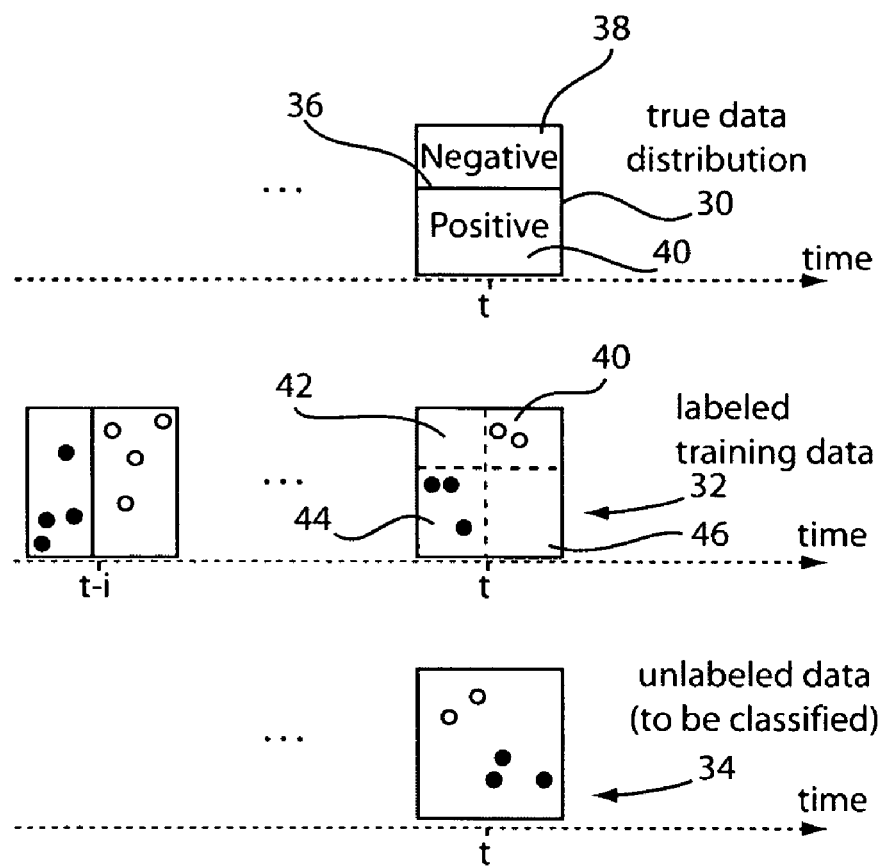
FIG. 2 is a diagram showing overfitting as a result of using an unrepresentative dataset for validating member classifiers in an ensemble.

As an example, FIG. 2 shows a true class distribution 30 (unknown to the stream classifier), with a stream of labeled data 32 for training, and a stream of unlabeled data 34 to be classified. The true data distribution 30 is represented by an optimal decision boundary 36 that divides the two dimensional spaces into an upper half 38 and a lower half 40, such that cases in the upper half are negative, and lower half positive.

At time t, the training data 32 and the unlabeled testing data 34 can be regarded as samples drawn from the true class distribution 30. But, the training data 32 can be an unrepresentative sample. If the two dimensional vector space is divided into four regions, all the training records cluster in two of the regions, regions 40 and 44. In an upper-left region 42 and a lower-right region 46, no records are sampled. For a classifier learned from or evaluated by such a training dataset, there is no assurance of its authority in its prediction for records in these two regions 42 and 46.

Unrepresentative training sets give rise to overfitting. A classifier learned from an unrepresentative training set may focus on its biased data characteristics. Second, using this training set for validation may give meaningless scores. In FIG. 2, for example, if the training data at time t is used to rank historical classifiers, it will be found that the classifier learned at time t−i is perfectly accurate. As a result, the classifier will be highly weighted in classifying future data. However, it represents a class distribution which is utterly different from the current class distribution 30. Hence, when the classifier is applied on the testing data 34 at time t as shown in the FIG. 2, the accuracy will be extremely low.

The problem is that, although the training dataset 32 and the testing dataset 34 are from the same underlying class distribution, the idiosyncrasy of the training dataset 32 may prevent its generalizing for the testing dataset 34. High speed, bursty streams contribute to the idiosyncrasy of data in small windows. In particular, many applications work with data with rare class distribution.

In an extreme case, consider a class distribution where positive cases (network intrusions, patients with terminal diseases, financial transaction fraud, etc.) are extremely rare (e.g., 0.1%). Then, it is very likely that in the training dataset 32, at time t, that part of feature space that includes positive cases are not sampled. It thus makes no sense to evaluate historical classifiers on such a training dataset 32.

Cost of Learning: Efforts of improving stream classifiers are entangled between suppressing evolving concepts and reducing model overfitting. Solutions to one problem often aggravate the other. This makes it difficult to improve prediction accuracy. In addition, state-of-the-art approaches also suffer from high cost of model learning. It is known that incrementally maintaining a global classifier can be very costly. The decision trees are constructed in a greedy divide-and-conquer manner, and they are unstable. Even a slight drift of the underlying concepts may trigger substantial changes (e.g., replacing old branches with new branches, re-growing or building alternative sub branches) in the tree, and severely compromise learning efficiency.

The ensemble approach aims at reusing previously learned models. However, to evaluate the historical classifiers, the models need to be applied on the most recent training dataset.

In other words, every classifier on every training record is to be consulted. This may become too time-consuming in processing large-volume, high-speed streaming data for time-critical predictions.

In accordance with present principles, a new ensemble approach is employed for classifying streaming data because ensemble approaches permit reusing previously learned models. One feature is to devise a mechanism of combining member classifiers in the ensemble for better classification accuracy. In the stream environment, the combining mechanism considers three factors, namely, time, space, and size, of the historical data.

Size matters only for static data. When there are no concept drifts, enlarging the training dataset to include more instances will help reduce overfitting.

Figure 3:
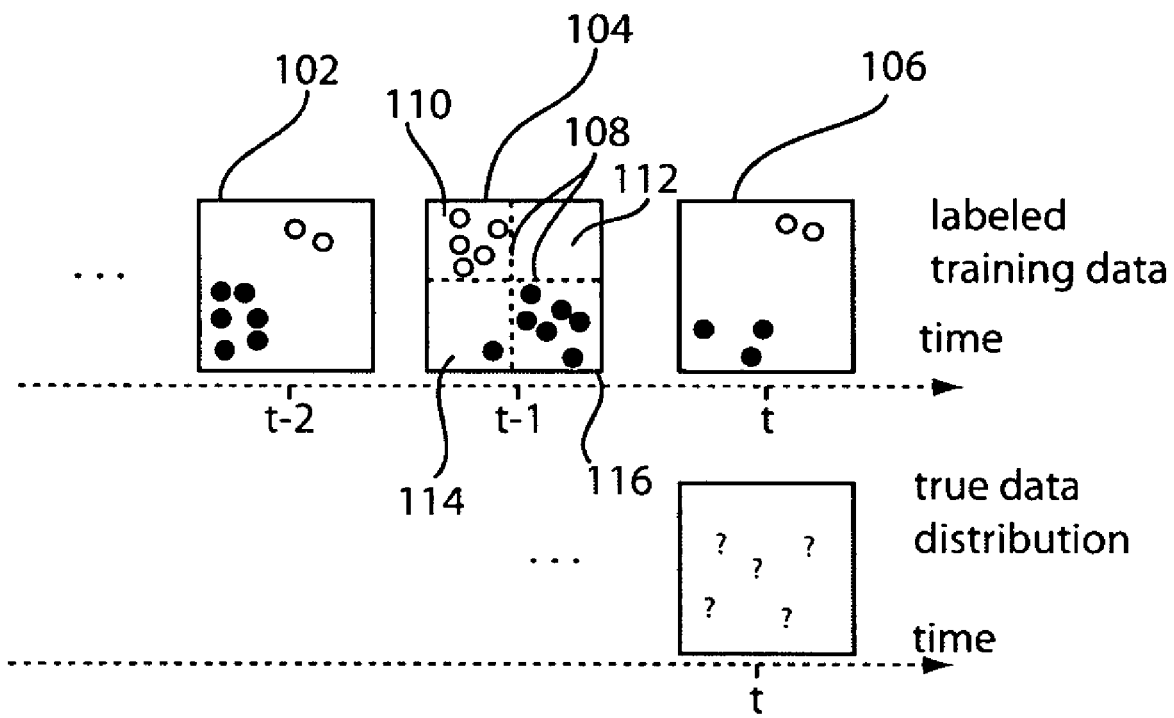
FIG. 3 is a diagram showing the deriving of a true data distribution from recent training datasets.

Referring to FIG. 3, three chunks of data 102, 104 and 106 arrive continuously. The most recent dataset, which is of timestamp t, is likely to be a distorted sample, as it includes very few instances. However, because there are no concept drifts, if the datasets 102, 104 and 106 are combined at times t, t−1, and t−2, a much safer resulting dataset, which is more representative of the true data distribution, is provided. Hence, a classifier learned from such a dataset has lower risk of overfitting. In other words, by combining the three datasets 102, 104 and 106, the true class distribution is more likely covered.

The time, space, and size factors for streaming data: What if a concept drift occurs between window t−1 and t or between window t−2 and t−1? How are learned classifiers combined from the three chunks of records?

With the assumption that the occurrences of concept drifts are not predictable, it may never be certain what the true data distribution is. However, it is still possible to derive the most likely class distribution given a series of observations in the previous time windows.

As in FIG. 3, given the series of training sets in window t, t−1, ..., the true class distribution is "shaped" by these data sets (102, 104, and 106) at least to some extent. Because of the concept drifts, their relationship to the most likely current distribution is different. To recover the true data distribution from these data sets, how trustworthy each of the data sets is needs to be determined. In addition, how to combine the trustworthiness also needs to be determined.

Given the three training datasets 102, 104 and 106, the following observations may be made:

1) Time. Generally speaking, the training dataset of window t has more authority than that of t−1 and t−2 simply because this training dataset is current, while training dataset t−1 is likely to represent an outdated distribution, and training dataset t−2 is even more likely to be outdated. In other words, when combining historical classifiers, we should give older datasets lower weights.

2) Space. Dotted lines 108 in window t−1 divide the 2 dimensional space into four regions 110, 112, 114 and 116. Although window t is more current, the classifier learned from window t−1 has more authority in classifying records that fall in the upper-left subspace 110. This is so because data 106 in the current window t has no presence in the same corresponding region.

3) Size. For the classifier learned from data 104 in time window t−1 a higher weight is assigned for a classifier prediction of records in upper-left region 110 than the lower-left region 114. This is so because in the upper-left region 110, there are a larger number of records. Clearly, size and space are related. In other words, a classifier always has longer authority in regions of higher training data density.

The problem of deriving the most likely current class distribution from a sequence of perceived data distribution considers the time, the space, and the size factors in combining historical classifiers. To quantify the weights by time, space, and size an optimization problem will be formulated hereinafter, and give an analysis of an optimal way of composing historical data.

Given an ensemble of historical classifiers, the weights of the classifiers needs to be decided in a meaningful way so that the ensemble can model the current class distribution. For simplicity, in the present analysis, the assumption that there are only two classes, positive and negative is made. Note that it is straightforward to generalize the present analysis to multi-class cases.

As discussed above, historical data should he leveraged to improve the estimation of the current class distribution. However, giving historical data the same weight as the current data hurts classification accuracy when there is a concept drift between the time the historical data is delivered and the current time. The present principles are employed to derive a model that balances the influences of historical data so that a model can be derived that reflects the most likely current class distribution.

The timestamp of a historical dataset is one piece of information used to determine its influence on the current class distribution. The possibility of existence of class drifts increases monotonously as the length of time between the current time and the time when historical data is collected increases. However, it is generally impossible to model concept drift in a deterministic manner as concept drifts can happen at any point in time between the current time and the time of the historical data. Stochastic models may be employed to account for the uncertainty of the occurrences of concept drifts.

Hidden Markov models (HMMs) are particularly useful because I) HMMs have been used in many fields to model uncertainty and have demonstrated success in practice; II) HMMs permit decoupling of the observed outcome of training samples from the posterior class distribution. In a Hidden Markov Model, the states represent the posterior class distribution rather than observed training sample distributions. Training sample distributions follow the class distribution of the hidden state. III) HMMs permit minimum assumptions to be made as the stochastic process is embedded in the structure of the hidden Markov chain.

Another useful piece of information is the density of historical data in different regions of the feature space. A classifier is less likely to be overfitted in regions where there are a large number of training records. This means predictions for samples in regions of high training data density should have a high weight. It follows that the feature space can be divided into regions and each region modeled with a Markov chain. In other words, a classifier will be weighted by both the time of its training data, and by their regions in the feature space.

Given these pieces of information, a most-likely current class distribution is to be determined. This is similar to finding the current class distribution that maximizes the probability that is observed for the data in the previous windows. Table 1 shows notations that will be employed.

TABLE 1

| | |
|---|---|
| t | size of time window |
| $W_i$ | time window i |
| $W_n$ | current time window |
| V | feature vector space |
| $S_j$ | a region in the feature vector space, $V = \cup S_j$ |

TABLE 1-continued

| | |
|---|---|
| $N_i$ | total number of instances observed in time window $W_i$ (of a given region) |
| $f_i$ | observed class distribution in time window $W_i$ (of a given region) |
| $q_i$ | posterior class distribution in window $W_i$ (of a given region) |
| $q_n$ | posterior class distribution in window $W_n$ (of a given region) |
| $\lambda$ | rate of concept drifts |
| $C_i$ | the event that the latest concept drift occurs between time window $W_{i-1}$ and $W_i$ |
| $Y_i(x)$ | the probability of the observation in time window $W_i$ given that the class distribution is x |
| $L_i$ | the probability of the observation across all time windows given $C_i$ |

Figure 4:
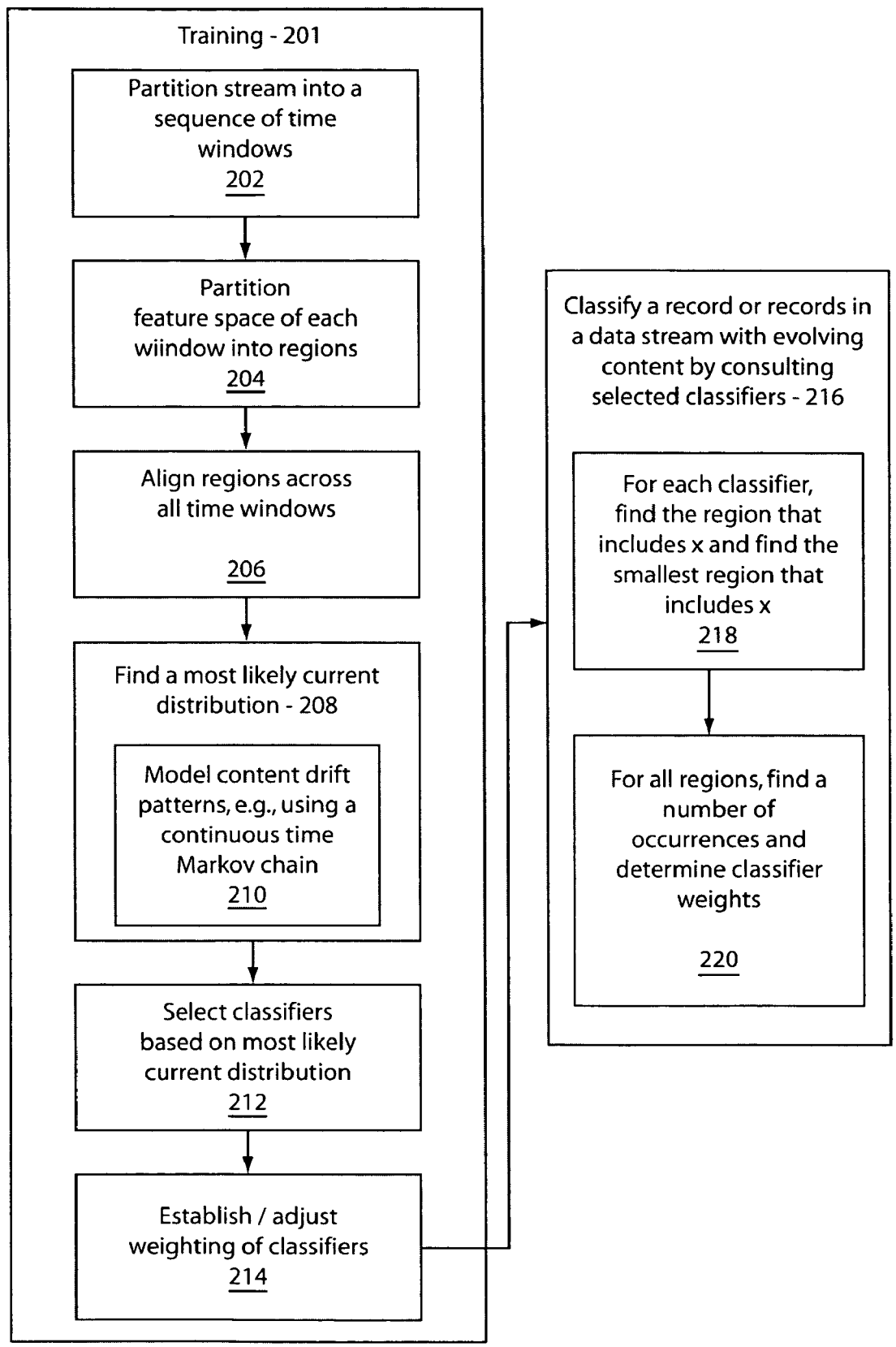
FIG. 4 is a block/flow diagram showing steps for training models and classifying records in concept evolving data streams.

Referring to FIG. 4, a system and method for learning models and classifying records from scarce and skewed training data is shown in accordance with an illustrative embodiment. Block 201 includes training steps. The system/method advantageously weights history by time and space (and size). In block 202, a stream is partitioned into a sequence of time windows, each of fixed time interval t. Assume windows $W_1, W_2, \ldots, W_n$, with $W_n$ being the most recent window. Contrast this with previous approaches, which partitioned the stream into windows of fixed number of instances. However, the inventors realize that the occurrence of concept drifts is more likely to be a function of time rather than the number of arriving instances. A bursty arrival of a large number of instances does not mean the underlying class distribution is changing at a fast rate. Thus, time windows are more natural in modeling concept drifts.

In block 204, a feature space V is partitioned into a set of non-overlapping regions, $S_1, S_2, \ldots, S_m$. The regions are aligned across all time windows. As described, the trustworthiness of a classifier learned from data in a particular window may be different in different regions of the feature space. In the stream environment, a training dataset may have certain idiosyncrasies. For example, a burst of packets that arrive within a short time interval may all have the same source IP. The classifier learned from such a training data may have low authority in classifying records in other regions of the feature space. By weighting classifiers on regions, overfitting caused by biased sampling can be avoided.

In practice, there are many different ways to partition the feature space into multiple regions. To simplify the analysis, the partition method ensures that for records of the same region, a classifier makes the same prediction. For example, in a decision tree, each leaf node in fact represents a region in the feature space. The class prediction for a test case that falls into a leaf node is $n_1/(n_1+n_2)$, where $n_1$ and $n_2$ are the number of positive and negative cases that belong to this leaf node in the training data. This means all cases that fall into the same leaf node will share the same prediction. In block 206, regions are aligned across all time windows. This is done by subdividing a region until it is included in a certain leaf node of all classifiers.

For two-class data, the class distribution in any region can be sufficiently captured by a value in [0, 1], which represents the probability that a test case in that region is positive. Use $f_i$ to denote the positive class distribution in a region according to the classifier learned from data in $W_i$. In other words, $f_i$ is the prediction given by the classifier to test cases that fall in the region. Given that there are $N_i$ training cases in a region, there are $N_i f_i$ positive samples and $N_i - N_i F_i$ negative samples in the region.

In block 208, the most likely current distribution is found. Concept drift patterns are leveraged to make a better use of historical data. To capture the non-deterministic nature of concept drifts in a region, the concept drift process is modeled as a continuous time Markov chain in block 210. Each state in the Markov chain represents a posterior class distribution at a particular point of time. The instances observed at that time are a sample from the distribution.

Concept drifts are modeled by change of states. A state can have multiple ingress edges. Assume for a given state there are m such edges representing transitions of rates $\lambda_1 \ldots, \lambda_m$ respectively. $\lambda$ is employed to denote the aggregated ingress transition rate, $$\lambda = \sum_{i=1}^{m} \lambda_i.$$

Figure 5:
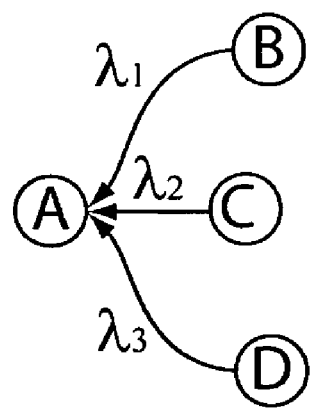
FIG. 5 is a diagram showing a Markov Model showing a state A with an aggregated transition rate for content shifts.

An example is shown in FIG. 5, where state A has three ingress edges with aggregated rate $\lambda = \lambda_1 + \lambda_2 + \lambda_3$ from states B, C and D, respectively.

In the data stream environment, learning the structure of the Hidden Markov Model is employed in decoding the underlying data generation mechanism. This may be a time-consuming task, which makes it unrealistic for high volume, fast speed data streams. In the present analysis, it is assumed that the aggregate ingress rate of each state is the same. This actually means that the possibility of having concept drifts is distributed uniformly across the time axis. In other words, it is assumed for simplicity of explanation that concept drifts are identically and independently distributed across the continuous time. Standard probability theory indicates that the only distribution satisfying this property is a Poisson process. The present embodiments may also include cases where the concept drifts are not identically and/or independently distributed across the continuous time.

Figure 6:
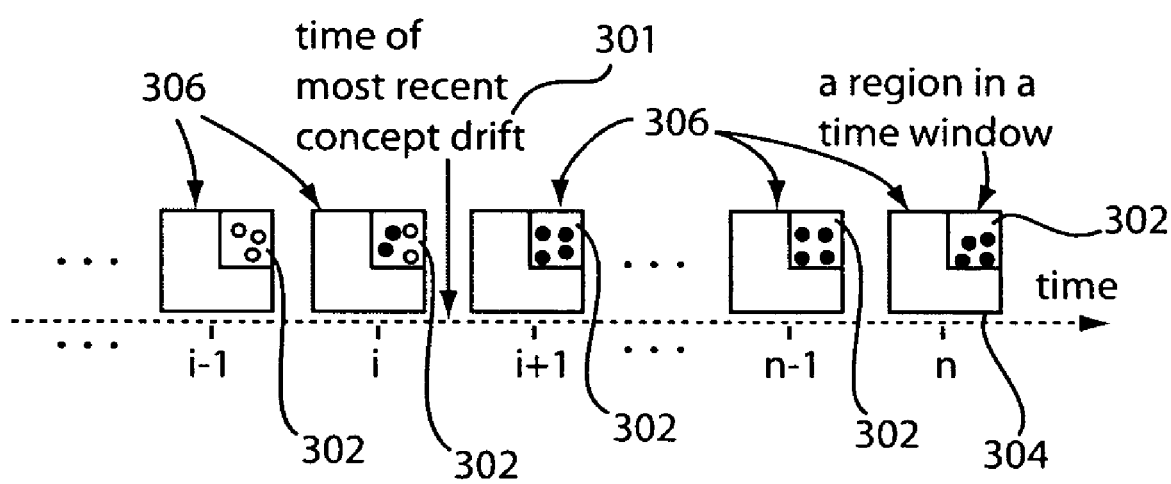
FIG. 6 is a diagram showing concept drifts within a region across time windows.

In block 210, concept drifts are modeled. An illustrative example describes concept drift modeling in FIG. 6. Referring to FIG. 6, concept drifts within a region across time windows 306 are illustratively depicted. A region 301 that is undergoing concept drifts across time is shown. The most recent concept drift that has occurred is modeled. Let n be the timestamp of a current window 304. Let $C_i$ represent the event that the most recent concept drift occurs between time i and time i+1. Given the aggregated rate of transition into the current state in the Markov model is $\lambda$, the probability that no concept drift occurs during an x time window internal is $1 - e^{-\lambda x t}$. Thus, the most recent state transition occurs between time window i and time window i+1 is $$P(C_i) = (1 - e^{-\lambda(n-i+1)t}) - (1 - e^{-\lambda(n-i)t}) \quad (1)$$
$$= e^{-\lambda(n-i)t} - e^{-\lambda(n-i+1)t}$$

Furthermore, if the posterior class distribution in the region at time i is x, the probability that $N_i f_i$ positive instances are observed out of the $N_i$ total instances in the region is:

$$Y_i(x) = \binom{N_i}{N_i f_i} x^{N_i f_i} (1-x)^{(N_i - N_i f_i)} \quad (2)$$

Let $q_i$ be the event that a random instance drawn from the region at time i is positive. Then, $P(q_i)$, the probability that a random instance is positive, is the positive class distribution at time i. If $C_i$ is true, that is, no concept drift occurs after time i+1, then, $P(q_{i+1}|C_i)=P(q_{i+2}|C_i)=\ldots=P(q_n|C_i)$. Given $C_i$, the probability that the training samples observed across all the windows from $W_{-\infty}$ to $W_n$ is:

$$L_i = \prod_{j=-\infty}^{n} Y_j(P(q_j|C_i)) = \prod_{j=-\infty}^{i} Y_j(P(q_j|C_i)) \times \prod_{j=i+1}^{n} Y_j(P(q_n|C_i)) \quad (3)$$

It is assumed that the states before the transition $C_i$ are independent of the current state. This obviates the need for considering the structure of the whole Markov chain and permits the focus of the analysis on the current state instead. With this simplification, the first term $$\prod_{j=-\infty}^{i} Y_j(P(q_j|C_j))$$

in Eq. 3 is a constant with respect to $P(q_n|C_i)$.

Based on optimization theory, $L_i$ is maximized when $$\frac{dL_i}{dP(q_n|C_i)} = 0$$

or at the boundary of $P(q_n|C_i)$, that is, when $P(q_n|C_i)$ equals 0 or 1. $L_i=0$ when $P(q_n|C_i)$ equals 0 or 1 unless the training samples are either all positive or all negative. For all other cases, $L_i$ is maximized when $$\frac{dL_i}{dP(q_n|C_i)} = 0.$$

Then, $\frac{dL_i}{dP(q_n|C_i)} = L_i \sum_{j=i}^{n} \left( \frac{N_j f_j}{P(q_n|C_i)} - \frac{N_j - N_j f_j}{1 - P(q_n|C_i)} \right) = 0$ As $L_i \neq 0$, $\frac{dL_i}{dP(q_n|C_i)} = 0$ can occur only when $$\sum_{j=i+1}^{n} \left( \frac{N_j f_j}{P(q_n|C_i)} - \frac{N_j - N_j f_j}{1 - P(q_n|C_i)} \right) = 0.$$

Solve the equation for $P(q_n|C_i)$, such that $L_i$ in Eq. 3 is maximized when:

$$P(q_n|C_i) = \frac{\sum_{j=i+1}^{n} N_j f_j}{\sum_{j=i+1}^{n} N_j} \quad (4)$$

In other words, given the observations in each window $W_i$, and the assumption that the most recent concept drift occurs between time i and i+1, the most likely current class distribution is computed by Eq. 4.

Since we have $P(\cup_i C_i)=1$ and $C_i \cap C_{i'}=\phi$ when $i \neq i'$. This leads to $$P(q_n) = \sum_i P(q_n|C_i)P(C_i).$$

Substituting $P(C_i)$ with Eq. 1, we get:

$$P(q_n) = \sum_i \left( \frac{\sum_{j=1}^{n} N_j f_j}{\sum_{j=i}^{n} N_j} (e^{-\lambda(n-i)t} - e^{-\lambda(n-i+1)t}) \right) \quad (5)$$

Classifiers are selected based on the most likely current distribution of classes in block 212. This shows that for any region, historical classifiers should be combined. For example, for class c, a classifier is weighted by the number of cases of class c in that region. In addition, its weight has an exponential time decay of parameter $\lambda$. Weighting of classifiers is performed in block 214.

The previous analysis leads to the following steps for providing a region-based ensemble stream classifier. In block 212, a sequence of k classifiers $C_n, C_{n-1}, \ldots, C_{n-k+1}$ trained from recent windows of fixed time intervals are selected and maintained, where k is a user parameter. The user also may provide parameter $\lambda$, the exponential decay rate. A larger decay rate discounts historical data more heavily and is used for streams of frequently changing class distributions.

To classify a record x, the k selected classifiers are consulted in block 216. In addition to a probabilistic prediction for x, each classifier $C_i$ returns the region $S_i$ that includes x. For decision tree classifiers, the region is the leaf node that x falls into, and the smallest region S among $\{S_i\}$ is found in block 218. Then, for each $S_i$, a range query is issued to find the number of instances that are within region S in block 220. $P_i$, the class distribution in the intersected region, is regarded as the prediction of $C_i$. A detail not shown in the algorithm is that when for a certain $S_i$, the intersected region has very low density, the original prediction of $C_i$ is employed. The probabilistic prediction is derived, and the weight based on the numbers is determined in block 220.

Blocks 216-220 may be implemented by the illustrative program 400 shown in FIG. 7. Note that program 400 consults every classifier. One improvement may include stopping consulting classifiers back in the history once it is relatively certain that the classifiers are unlikely to change final prediction (positive or negative). Since historical classifiers are heavily discounted, this may improve runtime performance.

Concept drifting patterns are exploited to improve accuracy and efficiency of data stream classifiers. With stochastic models of concept drifting, it is possible to formulate the classification problem as an optimization problem and derive an optimal solution. Then, a solution can be approximated for the optimization problem by combining a set of traditional classifiers. The experimental results conducted by the inventors show that these approaches result in significant improvement in terms of classification accuracy and efficiency compared to previous approaches that do not exploit concept drifting patterns.

Figure 8:
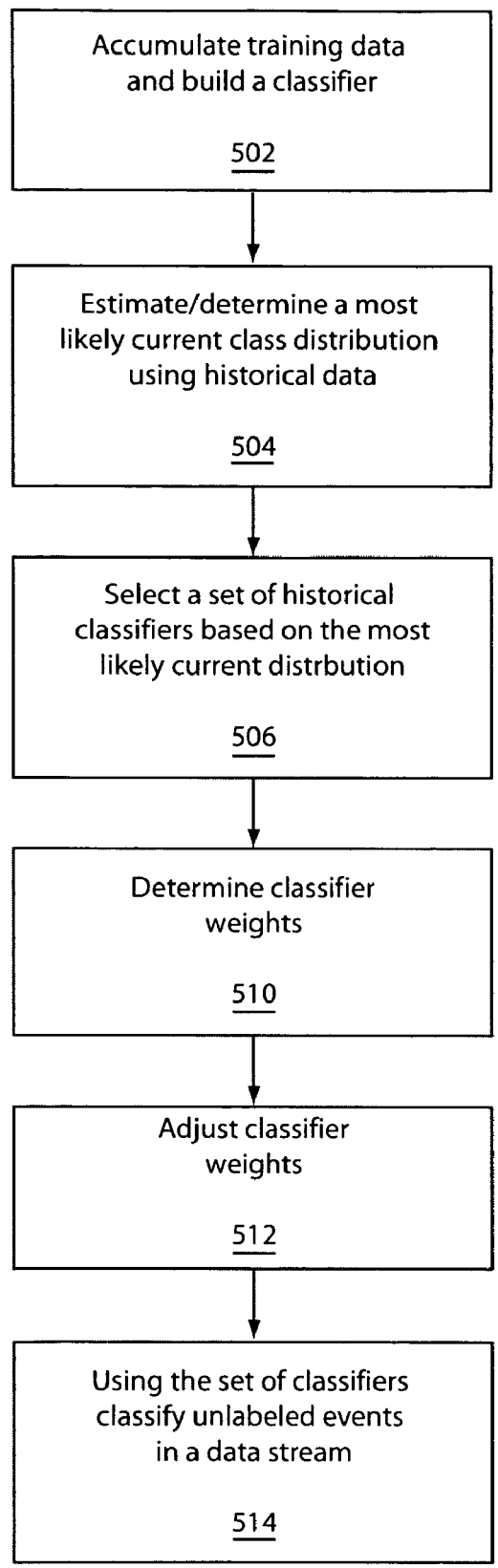
FIG. 8 is a block/flow diagram showing another illustrative embodiment for training models and classifying records in concept evolving data streams.

Referring to FIG. 8, another system/method for learning models and classifying records from scarce and/or skewed training data is shown in accordance with present principles. In block 502, a classifier is built based on accumulated training data. Training data may be streaming and employed to learn concept shifting patterns. The classifier is built using current and historical training data.

The classifier may be represented by a decision tree wherein the decision tree includes leaf nodes. The training data may be partitioned into a sequence of time windows with each window including a feature space which is divided into regions (S). A leaf node may represent each region.

In block 504, a most likely current class distribution is estimated/determined using historical training data. The historical training data may include past patterns and classifications. A concept drift model is preferably developed to estimate the most likely class distribution. A probability function is preferably optimized to determine the most likely current class distribution.

In block 506, historical classifiers are selected based on the most likely class distribution to form a set of classifiers used to classify streaming data with evolving concepts.

In block 510, classifier weights are determined based on a number of cases of a class in a portion of the training data, and weights of the classifiers may be adjusted in block 512. In block 514, unlabelled events are classified in streaming data using the set of classifiers.

Figure 9:
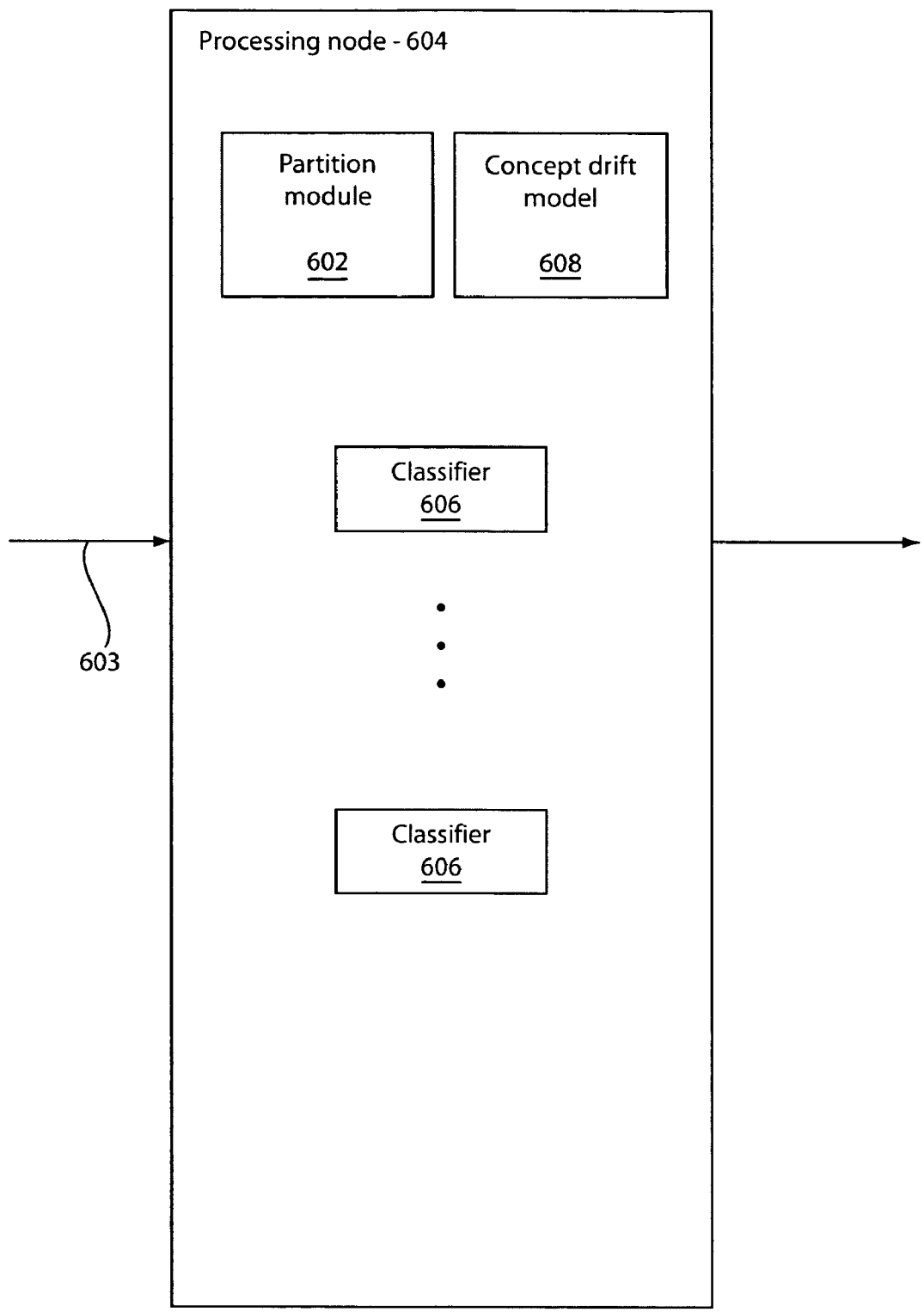
FIG. 9 is a block diagram showing an illustrative system for training models and/or classifying records in concept evolving data streams

Referring to FIG. 9, a system 600 for learning models from scarce and/or skewed training data and classifying streaming data with evolving concepts is illustratively shown. System 600 includes a partition module 602 configured to receive a data stream 603 and partition the data stream into a sequence of time windows. Each time window includes a feature space partitioned into regions. The partition module 602 may be part of a receiver or processing node 604 configured to consume a data stream in a network context or other computer or communication system environment.

Processing node 604 includes classifiers 606. Each classifier 606 has a weight based on a number of classes in each region. This weight is adjustable and may change over time as indicated in FIG. 7. The weight is based on a number of cases of the class in a region and the weight may include an exponential decay time.

The classifiers are configured to determine a most likely current class distribution for each window by employing observations of training data in the data stream and employing historical patterns using a concept drift probability model 608 to classify portions of the data stream. The concept drift probability model 608 is preferably configured to predict concept drift probabilities for each region.

Having described preferred embodiments of a system and method for learning models from scarce and skewed training data (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for learning models from scarce and/or skewed training data, comprising:
   building a classifier based on accumulated training data;
   estimating a most likely current class distribution using historical training data; and
   selecting historical classifiers from a memory device based on the most likely class distribution, wherein the classifiers are combined based on time, space and size to form a set of classifiers used to classify streaming data with evolving concepts.

2. The method as recited in claim 1, further comprising classifying unlabelled events in streaming data using the set of classifiers.

3. The method as recited in claim 1, wherein building a classifier based on accumulated training data includes representing the classifier by a decision tree wherein the decision tree includes leaf nodes.

4. The method as recited in claim 3, wherein the training data is partitioned into a sequence of time windows and each window includes a feature space which is divided into regions with each leaf node representing one region.

5. The method as recited in claim 1, wherein estimating includes developing a concept drift model to estimate the most likely class distribution.

6. The method as recited in claim 1, wherein estimating includes optimizing a probability function to determine the most likely current class distribution.

7. The method as recited in claim 1, further comprising determining classifier weights based on a number of cases of a class in a portion of the training data.

8. The method as recited in claim 1, farther comprising adjusting weights of the classifiers.

9. The method as recited in claim 1, wherein building a classifier includes employing current and historical training data.

10. A computer program product for learning models from scarce and/or skewed training data comprising a computer readable medium including a computer readable program, wherein the computer readable program when executed on a computer causes the computer to perform steps of:
    building a classifier based on accumulated training data;
    estimating a most likely current class distribution using historical training data; and
    selecting historical classifiers from a memory device based on the most likely class distribution, wherein the classifiers are combined based on time, space and size to form a set of classifiers used to classify streaming data with evolving concepts.

11. The computer program product as recited in claim 10, further comprising classifying unlabelled events in streaming data using the set of classifiers.

12. The computer program product as recited in claim 10, wherein building a classifier based on accumulated training data includes representing the classifier by a decision tree wherein the decision tree includes leaf nodes.

13. The computer program product as recited in claim 12, wherein the training data is partitioned into a sequence of time windows and each window includes a feature space which is divided into regions with each leaf node representing one region.

14. The computer program product as recited in claim 10, wherein estimating includes developing a concept drift model to estimate the most likely class distribution.

15. The computer program product as recited in claim 10, wherein estimating includes optimizing a probability function to determine the most likely current class distribution.

16. The computer program product as recited in claim 10, further comprising determining classifier weights based on a number of cases of a class in a portion of the training data.

17. The computer program product as recited in claim 10, further comprising adjusting weights of the classifiers.

18. A system for learning models and classifying evolving data, comprising:
   a machine having a memory device configured to receive into memory a data stream and partition the data stream into a sequence of time windows, each time window including a feature space partitioned into regions; and
   at least one classifier having a weight based on a number of classes in each region, the at least one classifier being configured to determine a most likely current class distribution for each window by employing observations of training data in the data stream and employing historical patterns using a concept drift probability model to classify portions of the data stream.

19. The system as recited in claim 18, wherein the concept drift probability model is configured to predict concept drift probabilities for each region.

20. The system as recited in claim 18, wherein the weight is based on a number of cases of the class in a region and the weight has an exponential decay time.

* * * * *